June 28, 1955 — E. B. BELLETT — 2,711,541
BUBBLE NOSE MASK
Filed Dec. 6, 1952

ETTIE B. BELLETT,
INVENTOR.

BY
ATTORNEY

United States Patent Office 2,711,541
Patented June 28, 1955

2,711,541
BUBBLE NOSE MASK

Ettie B. Bellett, Mill Valley, Calif., assignor of fifty per cent each to Irl R. Goshaw and Ralph D. Collins, both of Beverly Hills, Calif.

Application December 6, 1952, Serial No. 324,551

1 Claim. (Cl. 2—206)

This invention relates to novelties, and one in the form of a mask or representation of a face, which has the nose or other feature thereof formed by bubbles, particularly bubbles formed of bubble gum.

The production of bubbles with bubble gum or similar substances is well-known, the present invention being directed to the production of a facial feature by a gum bubble on a representation in the form of a mask. Contests may be instituted to determine the skill of bubble blower in producing the largest feature, such as a nose. The nose may be increased and decreased in size, producing very amusing effects.

The representations in the form of masks may be of clowns, skulls, pumpkin faces, animals, Santa Claus, etc., and may be as thin individual sheets or formed on the sides of packages containing food stuff or other products. The opening through which the feature is formed, such as a nose, may or may not be reinforced, depending upon the material of the mask and the amount of use made of the mask.

The principal object of the invention, therefore, is to produce a varying sized feature, such as a nose, on a representation such as a mask.

Another object of the invention is to provide a novelty adapted to have a feature thereof, such as a nose, formed from a bubble, such as a bubble formed from bubble gum.

A further object of the invention is to provide a mask having a nose formed from bubble gum.

A still further object of the invention is to provide a method of producing a feature, such as a nose, on a facial representation in the form of a mask.

Although the novel features which are believed to be characteristic of this invention will be pointed out with particularity in the appended claim, the manner of its organization and the mode of its operation will be better understood by referring to the following description, read in conjunction with the accompanying drawings, forming a part hereof, in which:

Figure 1:
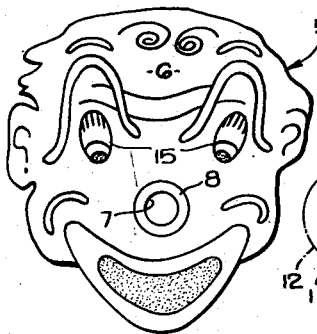
Fig. 1 is a front view of one representation in the form of a mask of a clown face.
Figure 2:
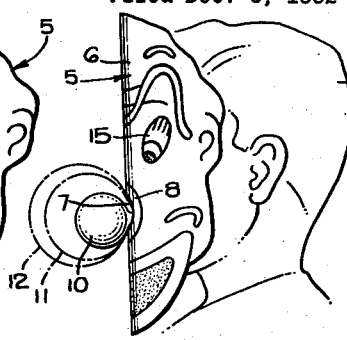
Fig. 2 is a side view of the invention illustrating how the nose of the clown mask of Fig. 1 is produced.
Figure 3:
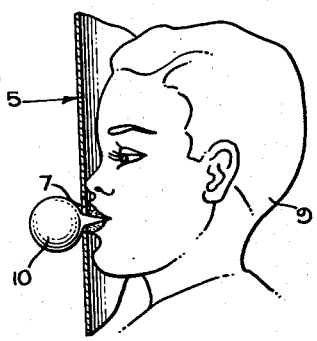
Fig. 3 is a cross-sectional view of the representation shown in Fig. 2.

Referring now to the drawings, and particularly Figs. 1, 2, and 3, a thin sheet of paper or pasteboard 5, although other flexible materials may be used, has printed thereon in black and white or colors, a clown face 6, in which a hole 7 is provided. A reinforcing ring 8 of paper, cloth, or plastic, may or may not be provided around the hole 7.

To provide a nose on the clown mask, bubble gum is chewed by a person 9 and then blown through the hole 7 by the person by placing the mouth of the person against the hole, as shown in Fig. 2. Various sizes of bubble noses may be produced, as shown by the lines 10, 11, and 12. If desired, the eyes 15 may have holes therein, through which the person 9 may observe the formation of the bubble or the bubbles being blown by others. Contests to determine the skill of children in blowing bubble gum noses may be conducted. The bubble may be left on the mask by closing the bubble and then releasing the gum from the mouth.

Figure 4:
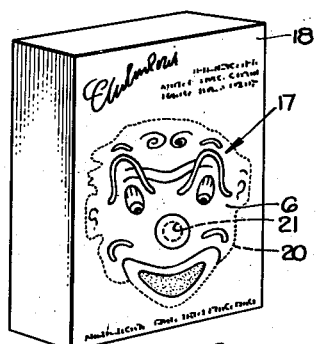
Fig. 4 is a perspective view of a carton of food or other product having the representation of Figs. 1, 2 and 3 printed on one or more sides thereof.

As shown in Fig. 4, representations such as shown at 17 may be printed or otherwise formed on the sides of food cartons 18 or cartons for other products. These representations may then be cut from the carton along the dotted line 20 and the nose hole 21 cut out for "blowing" the nose therethrough as explained above.

Figure 5:
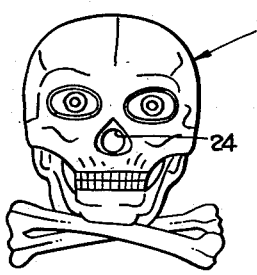
Fig. 5 is a front view of a representation in the form of a skull and cross bones mask.
Figure 6:
Fig. 6 is a front view of a representation in the form of a pumpkin face mask.
Figure 7:
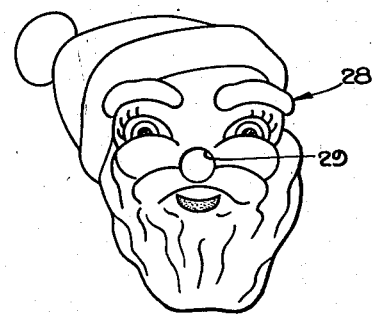
Fig. 7 is a front view of a representation in the form of a Santa Claus face.
Figure 8:
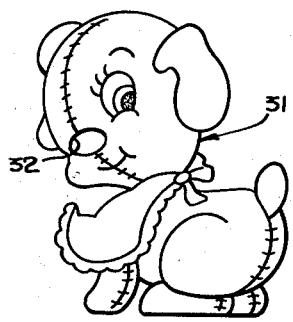
Fig. 8 is a side view of a representation in the form of an animal.

Other representations in the form of the skull and cross bones mask 23 with its nose hole 24 shown in Fig. 5, the pumpkin face 26 with its nose hole 27, the Santa Claus face mask 28 with its nose hole 29, and the animal mask 31 with its nose hole 32 may be provided. It is realized that any number of facial or figure representations may be produced, the above described masks having been used to provide particularly good entertainment when the noses therefor are produced from bubble gum. These other representations of facial features may also be printed on the sides of packages, such as shown in Fig. 4.

I claim:

A mask novelty for positioning in front of a person's face for the purpose of blowing a bubble from bubble gum through an opening in the mask comprising a flat flexible sheet having a facial representation thereon and adapted to be wrapped around the face of the person to cover the person's features including the neck, certain features on the mask corresponding in position to the features of the person, said sheet having an opening therein adapted to be positioned at the mouth of said person and within the position of the nose on said mask, and reinforcing material around said opening through which the bubble from said bubble gum is blown, said reinforcing material permitting the bubble to be retained on the mask after the releasing of the bubble gum from the mouth and the removal of the mask from the person's face.

References Cited in the file of this patent

UNITED STATES PATENTS

| | | |
|---|---|---|
| 885,802 | Sterrick | Apr. 28, 1908 |
| 891,122 | Wilcox | June 16, 1908 |
| 1,214,028 | Hainert | Jan. 30, 1917 |
| 2,000,242 | Manning | May 7, 1935 |
| 2,116,411 | Philipson | May 3, 1938 |
| 2,134,971 | Guyer | Nov. 1, 1938 |

FOREIGN PATENTS

| | | |
|---|---|---|
| 268,165 | Great Britain | Mar. 31, 1927 |